US008489783B2

(12) United States Patent
Wilson

(10) Patent No.: US 8,489,783 B2
(45) Date of Patent: Jul. 16, 2013

(54) MULTI BUFFER ASYNCHRONOUS SCHEME FOR PROCESSING INCOMING INFORMATION

(75) Inventor: Thomas James Wilson, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1637 days.

(21) Appl. No.: 11/650,036

(22) Filed: Jan. 3, 2007

(65) Prior Publication Data
US 2008/0162751 A1 Jul. 3, 2008

(51) Int. Cl.
*G06F 3/00* (2006.01)
(52) U.S. Cl.
USPC .................. 710/53; 710/52; 710/54; 710/55; 710/56; 710/57
(58) Field of Classification Search
None
See application file for complete search history.

(56) References Cited

U.S. PATENT DOCUMENTS

| 4,087,626 | A | * | 5/1978 | Brader ............................ 380/42 |
| 4,298,954 | A | * | 11/1981 | Bigelow et al. ................. 710/53 |
| 5,111,385 | A | * | 5/1992 | Hattori ........................... 711/157 |
| 5,483,261 | A | | 1/1996 | Yasutake |
| 5,488,204 | A | | 1/1996 | Mead et al. |
| 5,539,896 | A | * | 7/1996 | Lisle ............................. 711/150 |
| 5,568,165 | A | | 10/1996 | Kimura |
| 5,740,394 | A | * | 4/1998 | Minemura et al. ................ 5/411 |
| 5,825,352 | A | | 10/1998 | Bisset et al. |
| 5,835,079 | A | | 11/1998 | Shieh |
| 5,880,411 | A | | 3/1999 | Gillespie et al. |
| 6,122,274 | A | | 9/2000 | Kumar |
| 6,188,391 | B1 | | 2/2001 | Seely et al. |
| 6,310,610 | B1 | | 10/2001 | Beaton et al. |
| 6,323,846 | B1 | | 11/2001 | Westerman et al. |
| 6,445,700 | B1 | * | 9/2002 | Yusa et al. ..................... 370/366 |
| 6,507,877 | B1 | * | 1/2003 | Ross ............................. 710/53 |
| 6,587,112 | B1 | | 7/2003 | Goeltzenleuchter et al. |
| 6,640,269 | B1 | * | 10/2003 | Stewart .......................... 710/52 |
| 6,690,387 | B2 | | 2/2004 | Zimmerman et al. |
| 6,874,043 | B2 | * | 3/2005 | Treggiden ....................... 710/52 |
| 7,015,894 | B2 | | 3/2006 | Morohoshi |
| 7,184,064 | B2 | | 2/2007 | Zimmerman et al. |

(Continued)

FOREIGN PATENT DOCUMENTS

JP 06-149533 5/1994
JP 08-304482 11/1996

(Continued)

OTHER PUBLICATIONS

Lee, S.K. et al. (Apr. 1985). "A Multi-Touch Three Dimensional Touch-Sensitive Tablet," *Proceedings of CHI: ASM Conference on Human Factors in Computing Systems*, pp. 21-25.

(Continued)

*Primary Examiner* — Henry Tsai
*Assistant Examiner* — Jing-Yih Shyu
(74) *Attorney, Agent, or Firm* — Morrison & Foerster LLP

(57) ABSTRACT

Disclosed is an electronic device featuring a multi buffer scheme for processing incoming signals. For example, two buffers can be used. A processor can read and process stored signals from a first buffer while an incoming data module can concurrently store signals in a second buffer. Once, the processor is done, it can move on to the second buffer and process signals stored therein while the incoming data module stores signals in the first buffer. Also provided is a flagging scheme for allowing the processor and the incoming data module to control their respective access to the various buffers, so that only one of them accesses a single buffer at any time.

31 Claims, 8 Drawing Sheets

U.S. PATENT DOCUMENTS

| | | |
|---|---|---|
| 7,663,607 B2 | 2/2010 | Hotelling et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |

FOREIGN PATENT DOCUMENTS

| | | |
|---|---|---|
| JP | 2000-163031 A | 6/2000 |
| JP | 2002-342033 A | 11/2002 |
| WO | WO-2008/085787 A2 | 7/2008 |
| WO | WO-2008/085787 A3 | 7/2008 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Aug. 11, 2008, for PCT Application No. PCT/US07/89168, filed Dec. 28, 2007, two pages.

* cited by examiner

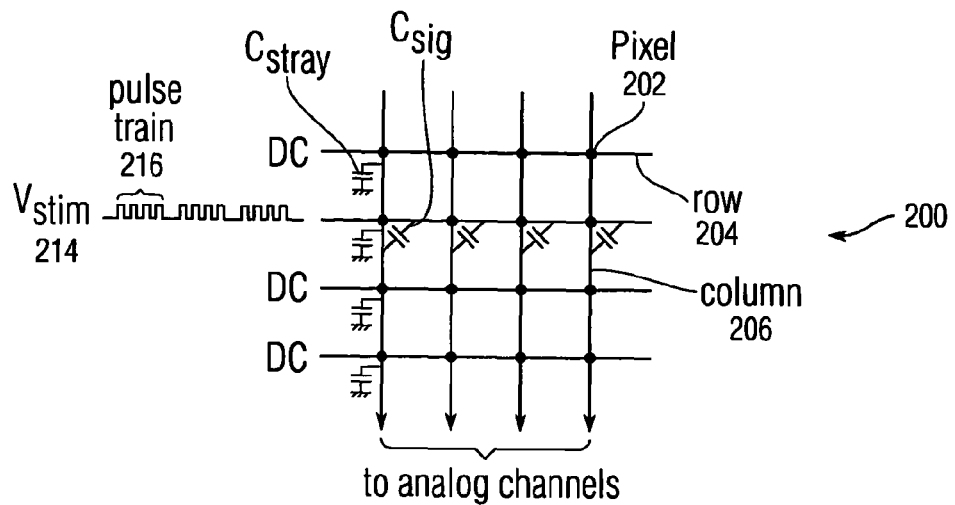
Fig. 2a
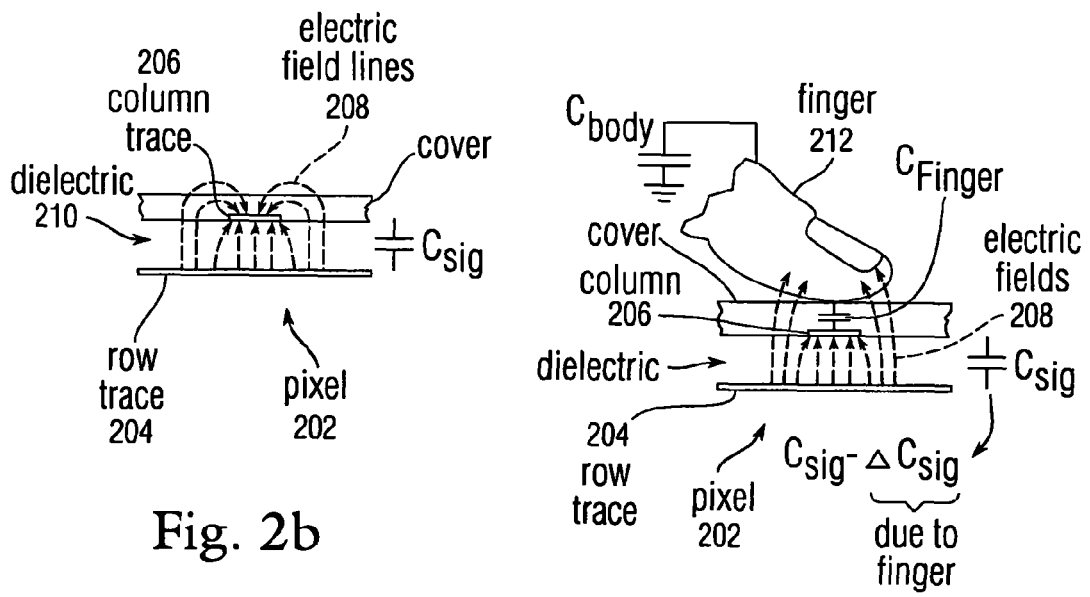
Fig. 2b
Fig. 2c

MULTI BUFFER ASYNCHRONOUS SCHEME FOR PROCESSING INCOMING INFORMATION

FIELD OF THE INVENTION

This invention generally relates to the processing of information, and more particularly, to a two buffer scheme for processing of information.

BACKGROUND OF THE INVENTION

Processing signals is an important function of many digital devices. For example a digital device can process signals which relate to certain external conditions, in order for the digital device to obtain information about the surrounding environment or to communicate with another device, or with a human user.

Usually, signals that indicate external conditions are obtained in analog format and converted to digital format for processing. The analog signals can be provided from various analog sensing circuits. For example, a multi touch sensor panel can include an array of sensors, each sensor being an analog sensing circuit.

While in many digital devices a microprocessor controls the timing of information transfer, this is usually not the case when the analog signals discussed above are processed, because often the analog signals are in the form of an uninterrupted stream of information. Thus, often there are significant timing constraints when a processor processes signals indicating external conditions.

The analog signals are usually converted to digital signals before being processed. In many cases the digital format conversion of the analog signals results in relatively large amounts of data. This is the case because analog signals are usually very dense in terms of the amount of data they can hold, and before more complex processing steps are taken it can not be known which portions of the analog signals and their digital representation comprise useful data and which do not.

The relatively large size of the resulting digital signal provides further timing constraints. More particularly, signals must be stored in memory before they are processed and memory storage takes time. Additionally, the large size of the digital signals also creates memory constraints and tends to increase memory requirements, and subsequently the cost of the device.

SUMMARY OF THE INVENTION

An embodiment of the present invention is directed to a multi buffer scheme for processing incoming signals. For example, two buffers can be used. A processor can read and process stored signals from a first buffer while an incoming data module can concurrently store signals in a second buffer. Once the processor is finished, it can move on to the second buffer and process signals stored therein while the incoming data module stores signals in the first buffer.

Also provided is a flagging scheme for allowing the processor and the incoming data module to control their respective access to the various buffers, so that only one of them accesses a single buffer at any time.

An embodiment can also include a mechanism for throttling the incoming signals. This can be used, for example, to ensure that the processor is able to process the incoming signals that have been received. In some embodiments the throttling can include controlling an element for sensing external conditions as to cease the generation of incoming signals.

BRIEF DESCRIPTION OF THE DRAWINGS

FIG. 2a illustrates an exemplary capacitive multi touch panel.

FIG. 2b is a side view of an exemplary capacitive touch sensor or pixel in a steady-state (no-touch) condition.

FIG. 2c is a side view of the exemplary capacitive touch sensor or pixel in a dynamic (touch) condition.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the preferred embodiments of the present invention.

Although embodiments of the present invention are described herein in terms of portable electronic devices, it should be understood that the present invention is not limited to such devices, but is generally applicable to any computing devices which require the storage and processing of significant amounts of data. In particular, FIGS. 1-3c and the accompanying text discuss an example of a device which can be used in conjunction with the present invention. The device is a portable electronic device featuring a multi touch sensitive panel. However, as discussed above, the present invention is not limited to this device or a device of this type.

Figure 1:
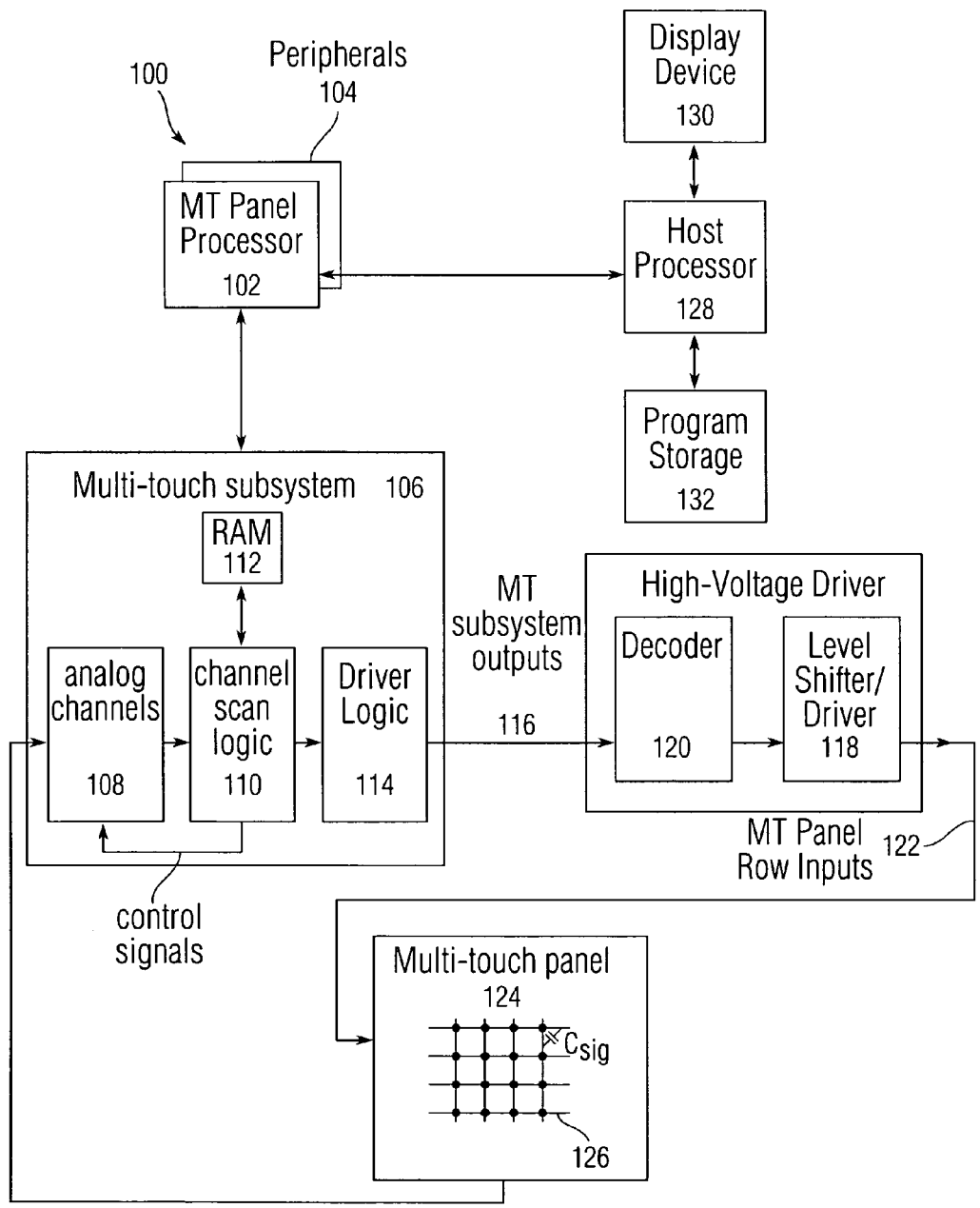
FIG. 1 illustrates an exemplary computing system using a multi touch panel input device.

Multi touch-sensitive panels may be able to detect multiple touches (touch events or contact points) that occur at about the same time, and identify and track their locations. FIG. 1 illustrates exemplary computing system 100 that uses multi touch panel 124. Computing system 100 can include one or more multi touch panel processors 102 and peripherals 104, and a multi touch subsystem 106. One or more processors 102 can comprise ARM968 processors or other processors with similar functionality and capabilities. However, in other embodiments, the multi touch panel processor functionality can be implemented instead by dedicated logic such as a state machine. Peripherals 104 can include, but are not limited to, random access memory (RAM) or other types of memory or storage, watchdog timers and the like. Multi touch subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi touch panel 124 to analog channels 108. In addition, channel scan logic 110 can control the driver logic and stimulation signals being selectively applied to rows of multi touch panel 124. In some embodiments, multi touch subsystem 106 and/or peripherals 104 can be integrated into a single application specific integrated circuit (ASIC).

Driver logic 114 can provide multiple multi touch subsystem outputs 116 and can present a proprietary interface that drives high voltage driver 118. High voltage driver 118 can provide level shifting from a low voltage level (e.g. CMOS levels) to a higher voltage level, providing a better signal-to-noise (S/N) ratio for noise reduction purposes. The high voltage driver outputs can be sent to decoder 120, which can selectively connect one or more high voltage driver outputs to one or more multi touch panel row inputs 122 through a proprietary interface and enable the use of fewer high voltage driver circuits in high voltage driver 118. Each multi touch panel row input 122 can drive one or more rows in multi touch panel 124. In one embodiment, high voltage driver 118 and decoder 120 can be integrated into a single ASIC. However, in another embodiment, high voltage driver 118 and decoder 120 can be integrated into driver logic 114, and in still another embodiment high voltage driver 118 and decoder 120 can be eliminated entirely.

Multi touch panel 124 can, in one embodiment, include a capacitive sensing medium having a plurality of row traces or driving lines and a plurality of column traces or sensing lines. The row and column traces can be formed from a transparent conductive medium such as Indium Tin Oxide (ITO) or Antimony Tin Oxide (ATO), although other non-transparent materials such as copper can also be used. In one embodiment, the row and column traces can be formed on opposite sides of a dielectric material, and can be perpendicular to each other, although in another embodiment other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in another embodiment, the rows and columns can be formed on a single side of a substrate, or can be formed on two separate substrates separated by a dielectric material. In one embodiment, the dielectric material can be transparent, such as glass, or can be formed from other materials, such as mylar.

At the "intersections" of the traces, where the traces pass above and below each other (but do not make direct electrical contact with each other), the traces essentially form two electrodes. Each intersection of row and column traces can represent a capacitive sensing node and can be viewed as picture element (pixel) 126, which can be particularly useful when multi touch panel 124 is viewed as capturing an "image" of touch. (In other words, after multi touch subsystem 106 has determined whether a touch event has been detected at each touch sensor in the multi touch panel, the pattern of touch sensors in the multi touch panel at which a touch event occurred can be viewed as an "image" of touch (e.g. a finger-shaped pattern).) When the two electrodes are at different potentials, each pixel can have an inherent or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on the multi touch panel can be detected by measuring changes to Csig. The columns of multi touch panel 124 can drive one or more analog channels 108 in multi touch subsystem 106. In some embodiments, each column is coupled to one dedicated analog channel 108. However, in another embodiment, the columns can be coupleable via an analog switch to a number of analog channels.

Computing system 100 can also include a host processor 128 for receiving outputs from multi touch panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor can also perform additional functions that are not related to multi touch panel processing, and can be coupled to program storage 132 and display device 130 such as an LCD display for providing a user interface (UI) to a user of the device.

FIG. 2a illustrates exemplary capacitive multi touch panel 200. FIG. 2a indicates the presence of a stray capacitance Cstray at each pixel 202 located at the intersection of a row (such as row 204) and a column (such as column 206) trace. Note that although FIG. 2a illustrates the rows and columns as being substantially perpendicular, they need not be so aligned, as described above. In the example of FIG. 2a, an AC stimulus Vstim 214 is being applied to one row, with all other rows connected to DC. The stimulus causes a static or steady-state mutual AC capacitance Csig to appear at the pixels of the row being provided with Vstim 214. Each of the columns can be selectively connectable to one or more analog channels (see analog channels 108 in FIG. 1).

FIG. 2b is a side view of exemplary pixel 202 in a steady-state (no-touch) condition. In FIG. 2b, an electric field comprised of electric field lines 208 between the column 206 and row 204 traces or electrodes separated by a dielectric 210 can create a signal capacitance Csig between the row and column electrodes when a stimulus is applied to the row trace.

FIG. 2c is a side view of exemplary pixel 202 in a dynamic (touch) condition. In FIG. 2c, finger 212 has been placed near the pixel 202. Finger 212 is a grounded object, and has an AC capacitance to ground of Cfinger. The body has a self-capacitance to ground Cbody of about 200 pF, where Cfinger is much larger than Cbody. If finger 212 blocks some of electric field lines 208 appearing between the row and column electrodes (those fringing fields that exit the dielectric and pass through the air above the row electrode), those electric field lines are shunted to ground through the capacitance inherent in the finger, and as a result, the steady state signal capacitance Csig is reduced by ΔCsig. In other words, the combined body and finger capacitance ΔCsig (which also can be referred to herein as Csig_sense) can act as a shunt or dynamic return path to ground, blocking some of the electric fields and resulting in a reduced net signal capacitance. The signal capacitance at the pixel becomes Csig−ΔCsig, where Csig represents the static (no touch) component and ΔCsig represents the dynamic (touch) component. Note that Csig−ΔCsig can always be nonzero due to the inability of a finger, palm or other object to block all electric fields, especially those electric fields that remain entirely within the dielectric material. In addition, it should be understood that as a finger is pushed harder or more completely onto the multi touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi touch panel 200 so that a change in signal capacitance can be detected when a finger, palm or other object is present. Vstim signal 214 can comprise one or more pulse trains 216 at a particular frequency, with each pulse train comprised of a number of pulses. Although the pulse trains 216 are shown as square waves, other waveshapes such as sine waves can also be employed. Plural pulse trains 216 at different frequencies can be transmitted for noise reduction purposes to detect and avoid noisy frequencies. Vstim signal 214 essentially injects a charge into the row, and can be applied to one row of the multi touch panel 200 at a time while all other rows are held at a DC level. However, in other embodiments, the multi touch panel can be divided into two or more sections, with Vstim signal 214 being simultaneously applied to one row in each section and all other rows in that region section held at a DC voltage.

Each analog channel coupled to a column can provide a value representing the AC or signal capacitance of the column that can include the signal capacitance present at the pixel in the row being stimulated, and any change in that signal capacitance due to the presence of a finger, palm or other body part or object. These column values provided by the analog channels can be provided in parallel while a single row is being stimulated, or can be provided in series. If all of the values representing the signal capacitances for the columns have been obtained, another row in multi touch panel 200 can be stimulated with all others held at a DC voltage, and the column signal capacitance measurements can be repeated. Eventually, if Vstim has been applied to all rows, and the signal capacitance values for all columns in all rows have been captured (i.e., entire multi touch panel 200 has been "scanned"), a "snapshot" of all pixel values can be obtained for entire multi touch panel 200. This snapshot data can be initially saved in the multi touch subsystem, and later transferred out for interpretation by other devices in the computing system such as the host processor. As multiple snapshots are obtained, saved and interpreted by the computing system, it is possible for multiple touches to be detected, tracked, and used to perform other functions.

In an alternative embodiment a proximity sensor panel can be used instead of the multi touch panel. The proximity sensor panel may sense hover events—i.e. events in which a finger or another object is placed in proximity to the panel instead of touching it. The proximity sensor panel may be configured in a manner similar to that of the multi touch sensor panel. However instead of using capacitances between the various row and column electrodes as the sensors, a light emitting diode (LED) and a light sensor (i.e., a photo diode) may be used for each pixel. The row electrodes can be connected to the LEDs of each row and the column electrodes can be connected to the light sensors of each column. Thus, the proximity sensor panel can sense multiple hover events in a manner similar to that of the multi touch panel discussed above. The proximity sensor and touch sensor functionalities can be combined in a single multi sense panel.

Figure 3A:
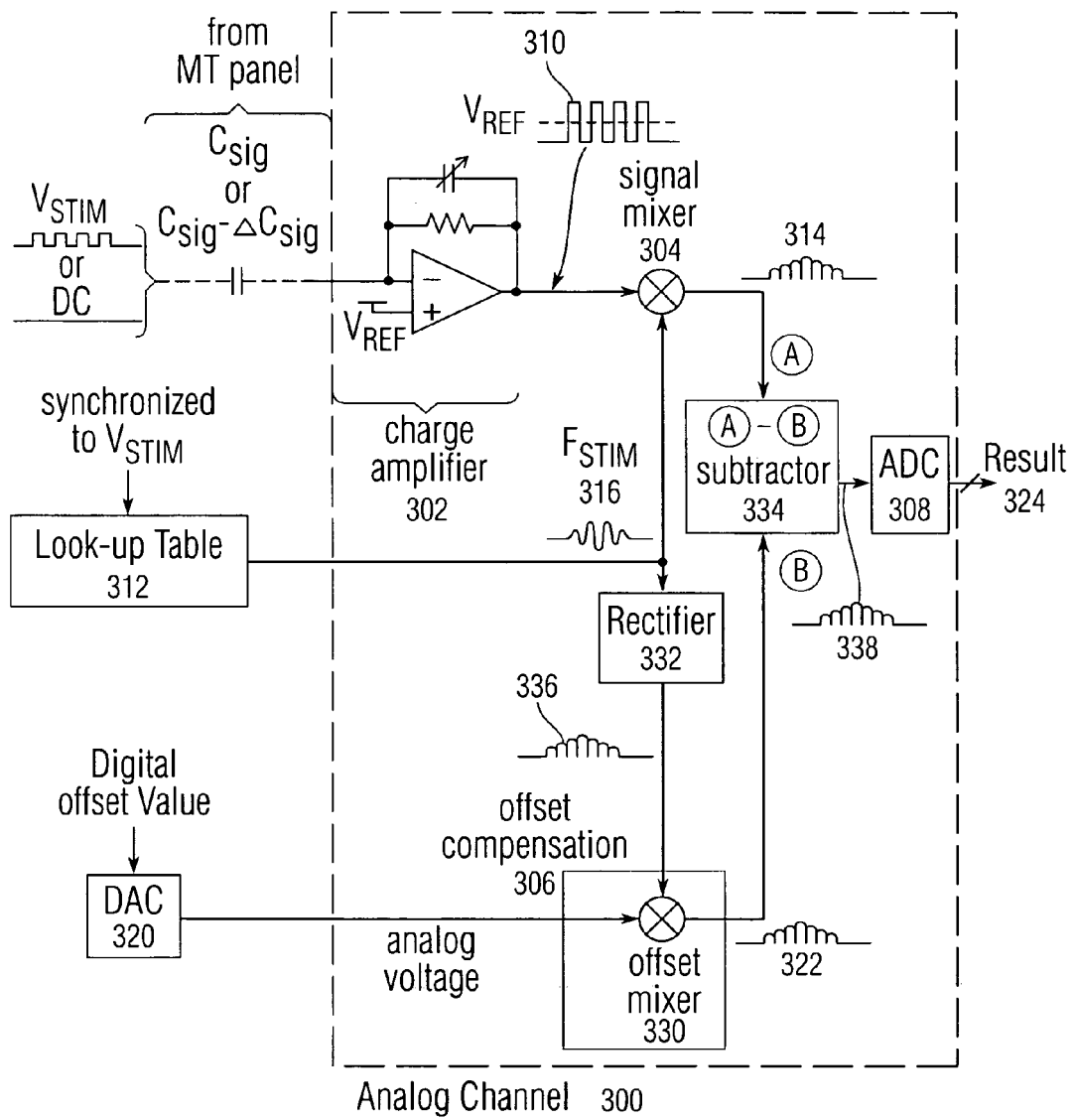
FIG. 3a illustrates an exemplary analog channel.

FIG. 3a illustrates exemplary analog channel 300. One or more analog channels 300 can be present in the multi touch subsystem. One or more columns from a multi touch panel can be connectable to each analog channel 108. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi touch panel column connected to the analog channel 300 when an input stimulus Vstim is applied to a row in the multi touch panel and no finger, palm or other object is present, and the dynamic signal capacitance Csig−ΔCsig that can appear when a finger, palm or other object is present.

Vstim, as applied to a row in the multi touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of the charge amplifier 302 can be a pulse train 310 centered at Vref with a peak-to-peak (p-p) amplitude in the steady-state condition that is a fraction of the p-p amplitude of Vstim, the fraction corresponding to the gain of charge amplifier 302. For example, if Vstim is comprised of 18V p-p pulses and the gain of the charge amplifier is 0.1, then the output of the charge amplifier can be 1.8V p-p pulses. This output can be mixed in signal mixer 304 with demodulation waveform Fstim 316.

Because Vstim can create undesirable harmonics, especially if comprised of square waves, the demodulation waveform Fstim 316 can be a Gaussian sine wave in an otherwise DC signal that is digitally generated from look-up table (LUT) 312 or other digital logic and synchronized to Vstim. In some embodiments, Fstim 316 can be tunable in frequency and amplitude by selecting different digital waveforms in LUT 312 or generating the waveforms differently using other digital logic. Signal mixer 304 can demodulate the output of charge amplifier 310 by subtracting Fstim 316 from the output to provide better noise rejection. Signal mixer 304 can reject all frequencies outside the passband, which can in one example be about +/−30 kHz around Fstim. This noise rejection can be beneficial in a noisy environment with many sources of noise, such as 802.11, Bluetooth and the like, all having some characteristic frequency that can interfere with sensitive (femtofarad level) analog channel 300. Signal mixer 304 can also be implemented as a synchronous rectifier, and as a result, signal mixer output 314 can comprise a rectified Gaussian sine wave.

Offset compensation 306 can then be applied to signal mixer output 314 at subtractor 334, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with an analog voltage from digital-to-analog converter (DAC) 320 in the offset mixer 330. Digital to Analog Converter 320 can generate the analog voltage based on a digital value selected to increase the dynamic range of analog channel 300. Offset compensation output 322, which can be proportional to the analog voltage from DAC 320, can then be subtracted from signal mixer output 314 using a subtractor 334, producing subtractor output 338 which can be representative of the change in the AC capacitance ΔCsig that occurs when a capacitive sensor on the row being stimulated has been touched. Subtractor output 338 can then be converted to a digital value by ADC 308. In one embodiment, ADC 308 can be a sigma-delta ADC, which can sum a number of consecutive digital values and average them to generate result 324.

Figure 3B:
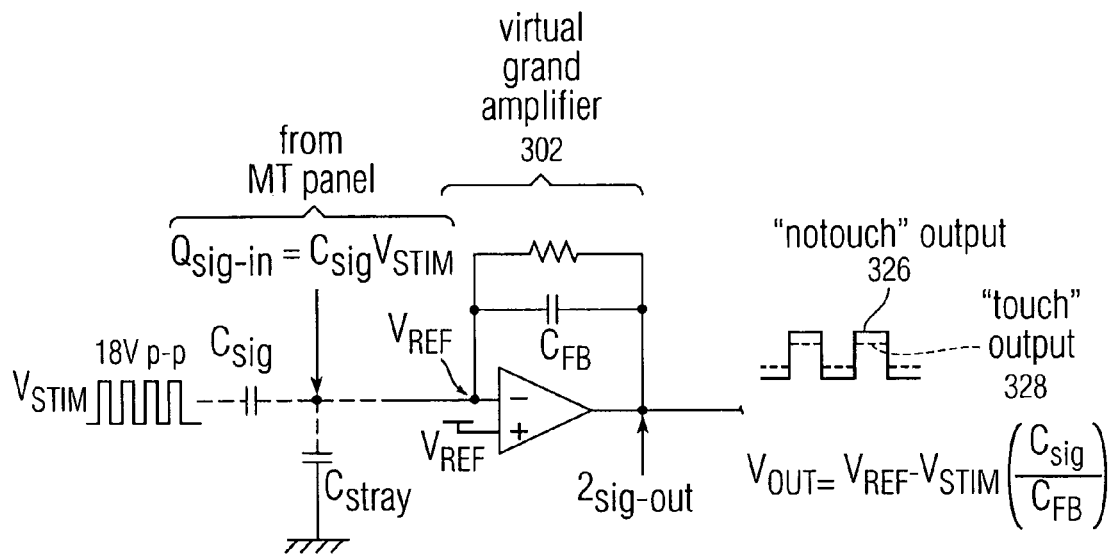
FIG. 3b is a more detailed illustration of a virtual ground charge amplifier at the input of an analog channel, and the capacitance contributed by a capacitive touch sensor and seen by the charge amplifier.

FIG. 3b is a more detailed view of charge amplifier (or virtual ground amplifier) 302 at the input of an analog channel, and the capacitance that can be contributed by the multi touch panel (see dashed lines) and seen by the charge amplifier. As mentioned above, there can be an inherent stray capacitance Cstray at each pixel on the multi touch panel. In virtual ground amplifier 302, with the noninverting (+) input tied to Vref, the inverting (−) input is also driven to Vref, and a DC operating point is established. Therefore, regardless of how much Csig is present, the inverting input is always driven to Vref. Because of the characteristics of virtual ground amplifier 302, any charge Qsig_in that appears across Cstray will be equal to the charge at the output of the charge amplifier, Qsig_out, and therefore no matter how much stray capacitance Cstray is added to the inverting input, the net charge across Csig will always be zero. In other words, because the voltage across Cstray never changes, there is no net charge across Csig. Note that Qsig_in can be equal to Qsig=CsigVstim in static conditions, and can be equal to Qsig_sense=(Csig−ΔCsig_sense)Vstim in dynamic conditions. In either case, because there is no charge across Csig, the stray capacitance is rejected, and it essentially drops out of any equations. Thus, even with a hand over the multi touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of Csig/Cfb multiplied by Vstim. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

Figure 3C:
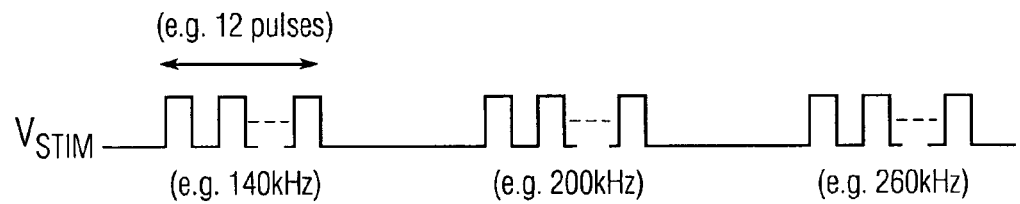
FIG. 3c illustrates an exemplary Vstim signal with multiple pulse trains each having a fixed number of pulses, each pulse train having a different frequency.

FIG. 3c illustrates an exemplary Vstim signal with multiple pulse trains each having a fixed number of pulses, each pulse train having a different frequency (e.g. 140 kHz, 200 kHz, and 260 kHz). With multiple pulse trains at different frequencies, one or more results can be obtained at each frequency. If a static interference is present at a particular frequency, the results at that frequency can be corrupted as compared to the results obtained at the other two frequencies, and those results can be eliminated. The results at the remaining two frequencies can be averaged to compute the result.

The multiple frequencies can be applied in different ways to the multi touch panel. In some embodiments, the same frequency can be sequentially applied to all channels (rows) (i.e. scanning one frame at a single frequency), and then repeated for the other two frequencies. In other embodiments, a low, medium and high frequencies can be applied to one channel, before moving on to the next channel. After an entire "image" is captured, it can be processed. In further embodiments, multiple stimuli (scan circuits) can be applied to different rows at the same time to speed up the process, which can be necessary for large multi touch panels and when communications are through USB, which could drop packets if too slow. The various applied frequencies can be programmable. The feedback capacitance Cfb and offset can also be programmable.

Figure 4:
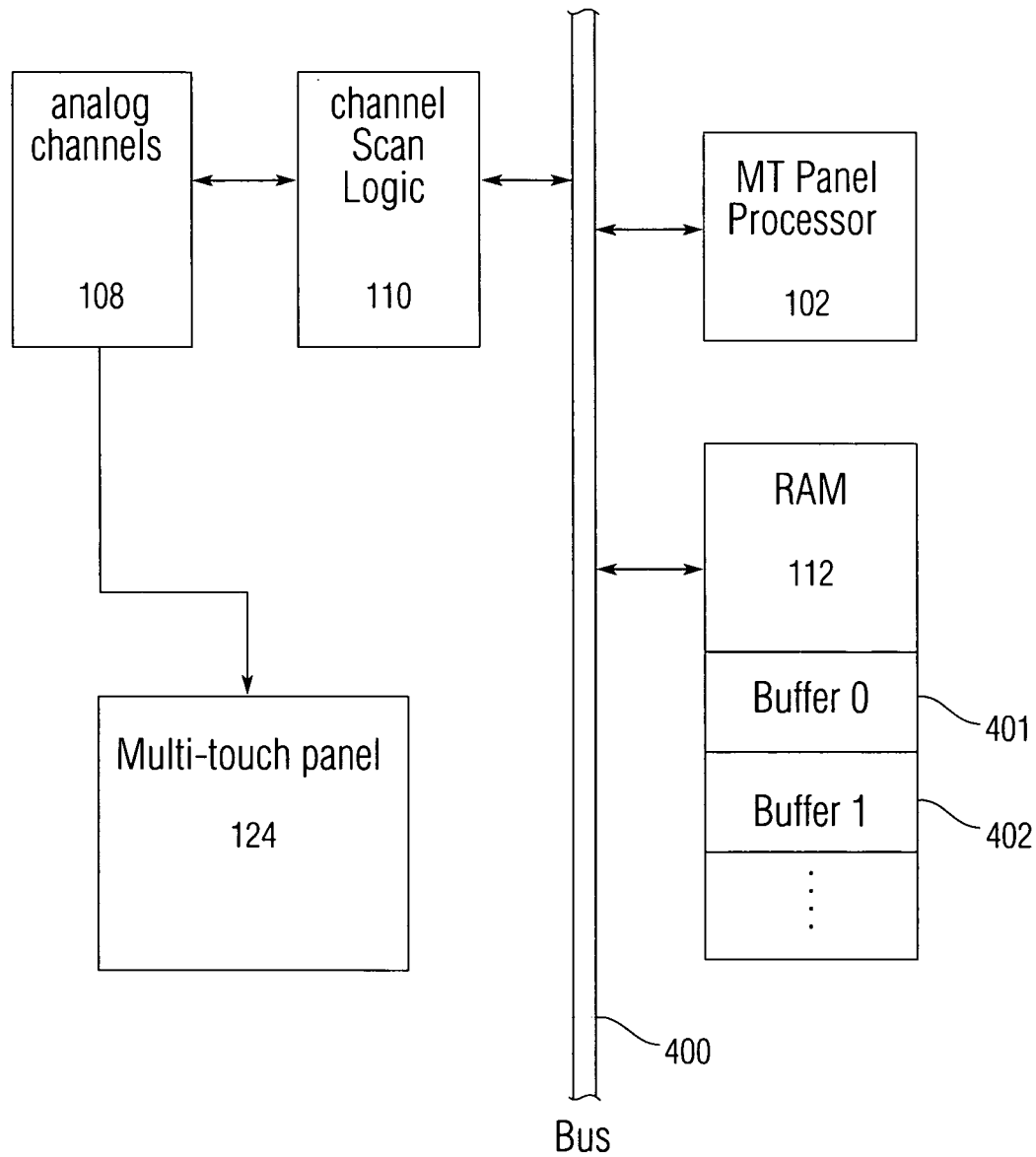
FIG. 4 is a diagram showing a more detailed view of certain elements of the multi touch subsystem, as well as the multi touch panel processor according to an embodiment of the present invention.

FIG. 4 is a diagram showing a more detailed view of certain elements of the multi touch subsystem 106, as well as multi touch panel processor 102. Shown are analog channels 108, channel scan logic 110, multi touch panel processor 102, RAM 112 and Multi touch panel 124.

Bus 400 is used to connect the channel scan logic, the multi touch processor and the RAM. The bus may also connect other elements. In addition, channel scan logic 110 may also be connected to driver logic 114 as shown in FIG. 1. All elements on the bus can possess the ability to receive communication on the bus. The channel scan logic and the multi touch processor can possess the additional ability to initiate communications on the bus. Thus, if bus 400 is a master slave bus, the channel scan logic and the multi touch processor may both include a master bus interface. In one embodiment, the channel scan logic and the multi touch processor may both feature an independent individual connection to RAM 112.

Random access memory 112 includes two buffers 401 and 402. In another embodiment, the RAM may include an additional number of buffers.

Channel scan logic 110 can control the scanning of the multi touch panel and the receipt of sensor signals therefrom. Thus the channel scan logic can send signals to driver logic 114 which cause the driver logic to stimulate the multi touch panel. Also, the channel scan logic can receive analog signals from analog channels 108 which include sensory information indicating whether or not various pixels are being touched.

The channel scan logic can process and digitize the received signals to obtain raw digital data which indicates whether various parts of the multi touch panel are being touched. In the preferred embodiment, the channel scan logic processes one row of the panel at a time and thus must send to the multi touch processor various sets of raw digital data representing different rows. In an alternative embodiment, the channel scan logic can process data in other groupings, such as, for example several rows, one or more columns, or an entire panel at a time.

The multi touch processor may process the raw digital data to produce a smaller amount of processed digital data which may in turn be used by host processor 128 to provide user input for an operating system, various applications, or other software running on the host processor. In an alternative embodiment, the multi touch processor also performs the function of the host processor and thus may run various software that uses the processed digital data.

In general the channel scan logic can send raw digital data to the processor by storing it in RAM 112. The channel scan logic can perform such storage by communicating with RAM 112 through bus 400. In an alternative embodiment the channel scan logic sends the raw digital data to a register file of multi touch processor 102 (not shown).

The preferred embodiment may place high requirements as to the speed of processing of the raw data by the multi touch processor. In order for the device to sense quick touches and movement of fingers on the multi touch panel, the entire multi touch panel must be quickly and repeatedly scanned for any touches. Consequently relatively large amounts of raw digital data must be processed by the multi touch processor.

Therefore, an embodiment of the present invention features a scheme in which multiple buffers (such as buffers 401 and 402) are used to store raw digital data for processing. Thus, the channel scan logic can store a set of raw digital data in one buffer while the multi touch processor accesses and processes data from another buffer. In addition, various flags can be used by the channel scan logic and the multi touch processor to indicate which buffer is being used and which buffer is free to be read by the multi touch processor or alternatively overwritten by the channel scan logic.

In this manner, the multi touch processor and channel scan logic can operate in parallel on two different buffers. This may improve the rate of processing of the raw digital data. Furthermore, this may limit the amount of memory that needs to be used for the storage and processing of raw digital data, by allowing two relatively small buffers in memory to be frequently reused for the storage and processing of multiple incoming small sets of raw digital data. Thus, the incoming raw digital data may be quickly stored, processed, and discarded to make space for new incoming raw digital data without using much memory.

Furthermore, an embodiment of the invention can use the flags to determine whether a condition in which neither buffer is available to write new raw digital data therein has occurred. In such a condition the channel scan logic may cease the production of raw digital data altogether until a buffer becomes available.

Most existing double buffering schemes require fully synchronous operation. In other words they require that data in a particular buffer is always processed in time to allow new raw data to be stored in that buffer. This synchronicity requirement often places a limit on the variety and complexity of processing operations which may be performed on the data, in order to ensure a limited and always predictable time of completion.

An embodiment of the present invention avoids this problem by using flags to block the incoming raw digital data when there is no free buffer to hold that data. In one embodiment, such blocking may result in loss of raw digital data that cannot be stored.

Another embodiment may actually block the production of raw digital data, so that no raw digital data or even analog data is actually lost. This may be achieved because channel scan logic 110 does not only process incoming analog data, it also controls the stimulation of the multi touch panel by communicating with driver logic 114. If the channel scan logic temporarily stops the stimulation signals to the multi touch panel, then the multi touch panel will produce no useful signals to send to the analog channels 108. Consequently, the analog channels will produce no raw analog data, and the channel scan logic need not produce any raw digital data.

Therefore, in one embodiment the channel scan logic may temporarily stop the generation of stimulation signals, if the flags indicate that storage of raw digital data should be blocked as there is no free buffer to store that data.

In the preferred embodiment, two single bit flags referred to as SA_flag and ARM_flag are used. The flags may be stored in memory 112, or they may be stored in a dedicated register. In the preferred embodiment, SA_flag can be controlled by channel scan logic 110, while ARM_flag can be controlled by multi touch processor 102.

Figure 5:
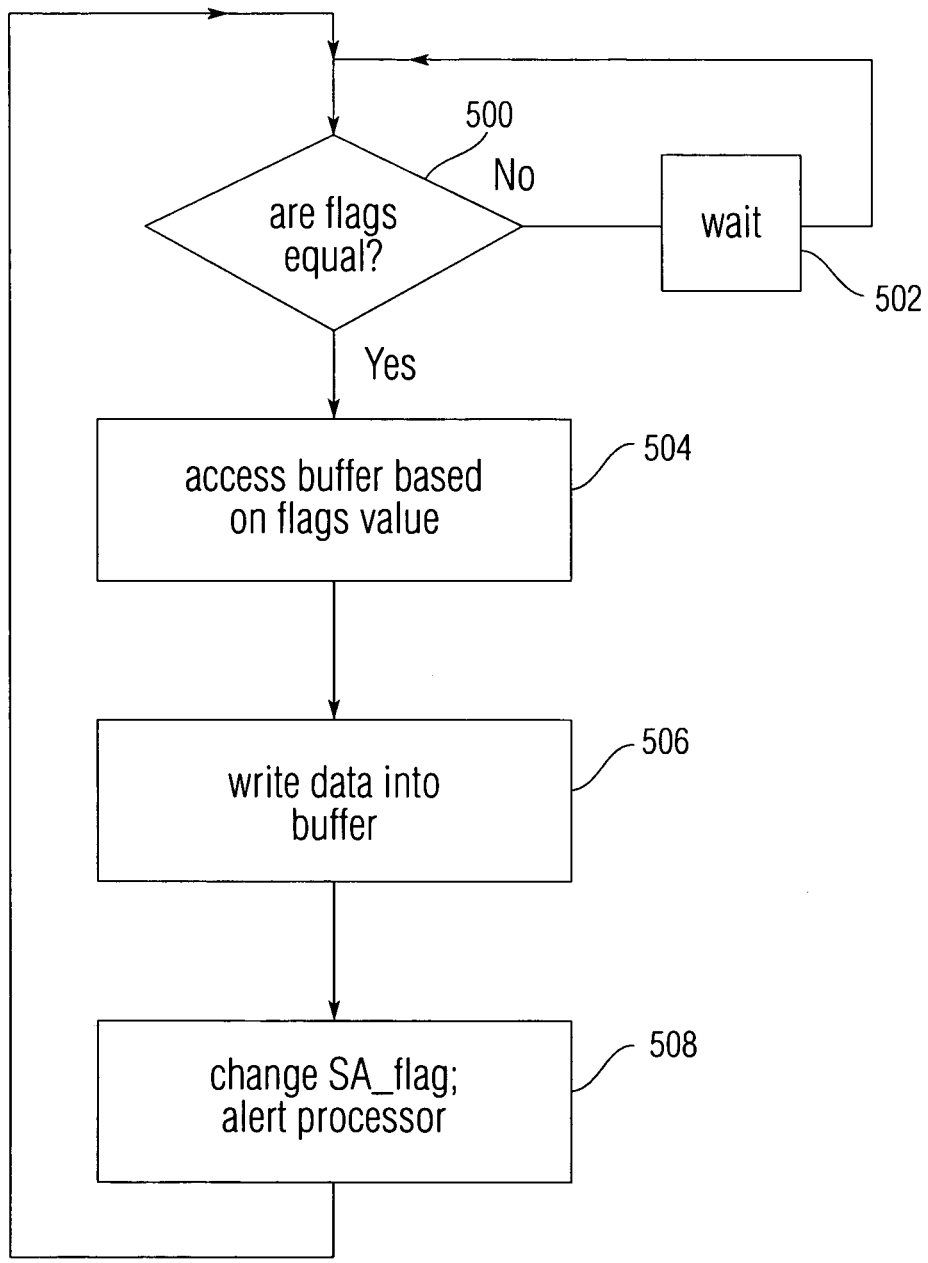
FIG. 5 is a flow chart showing the operation of the channel scan logic according to an embodiment of the present invention.

FIG. 5 is a flow chart showing the operation of the channel scan logic according to an embodiment of the present invention. At step 500, the channel scan logic determines if the two flags are equal. If they are not, the channel scan logic waits until they are (step 502). If they are equal, the channel scan logic proceeds to step 504, where it accesses a buffer based on the value of the flags.

In the preferred embodiment, the channel scan logic accesses buffer0 (401) if the flags are both at value 0 and buffer1 (402) if they are both at value 1. The channel scan logic then writes raw digital data into the accessed buffer in step 506. The channel scan logic can write a set of incoming data of predefined size. The set of data and its size may be chosen in various manners. In the preferred embodiment, raw data associated with a single row of the multi touch panel is saved in the buffer.

In step 508, the channel scan logic changes the SA_flag to its other value (the flag, being single bit, has only two values) and alerts the multi touch processor that it has finished saving a set of raw digital data. Alerting the processor may be performed, for example, by sending an interrupt signal to the processor. Alternatively, alerting may be performed by setting a value in the multi touch processor's register file or in any other known manner.

Execution then returns to step 500. It should be noted that at this point the channel scan logic may have to wait unless another entity (usually the multi channel processor) has changed the ARM_flag while the process of FIG. 5 was being executed by the channel scan logic.

Figure 6:
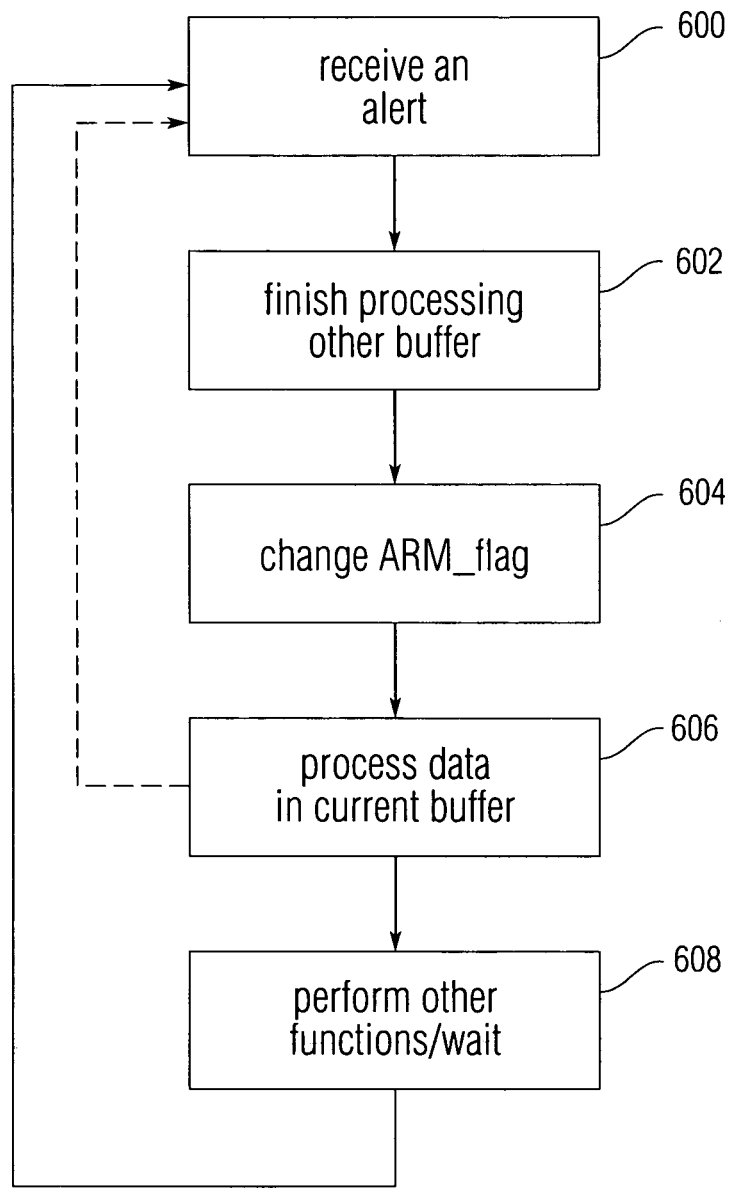
FIG. 6 is a flow chart of the operation of the multi touch processor according to an embodiment of the present invention.

FIG. 6 is a flow chart showing the operation of the multi channel processor according to an embodiment of the invention. At step 600 the processor receives an alert. This alert can be the alert sent by the channel scan logic in step 508 of its process. As noted above, the alert is preferably an interrupt. The alert indicates that the channel scan logic has finished filling a buffer with data.

At this time, the buffer the channel scan logic has finished storing data into is indicated by the value of ARM_flag. In the rest of the discussion of FIG. 6, this buffer will be referred to as 'the current buffer' and the other buffer as 'the other buffer'.

Having received the alert, the multi channel processor can proceed to process raw digital data or it can finish an unrelated operation it was performing when it received the alert. This choice depends on the specific programming of the processor.

However, after receiving the alert the multi channel processor can preferably finish all processing of raw digital data in the buffer other than the one indicated by ARM_flag (step 602). This is preferable, because by doing so the processor will free this other buffer to be overwritten by the channel scan logic. Step 602 need not be performed in each iteration of the process of FIG. 6. In some cases (preferably in the majority of cases) the multi touch processor is already finished processing all of the data in the other buffer, and is ready to begin processing data from a new buffer. However, if step 602 is necessary, it is preferable that it be performed in an expedited manner (e.g., at a higher priority).

At step 604, the processor switches the value of ARM_flag. The switching of this value indicates to the channel scan logic that the multi touch processor is finished processing the data in the other buffer and the channel scan logic can overwrite that data. If step 602 is not required, then the processor switches the value of the ARM_flag after receiving the alert.

At step 606, the multi channel processor proceeds processing the data in the current buffer. It should be noted that the current buffer is no longer the one indicated by the value of ARM_flag, because that value was recently switched (step 604). Therefore, the current buffer is the buffer opposite of the value of ARM_flag.

Having processed the data, the multi channel processor can perform other operations or wait (step 608) until it receives another alert and the process repeats. It should be noted that the second alert may be received during execution of step 606 (see broken line). Then in the next cycle, step 602 will be necessary to finish the processing of the previous cycle's step 606.

Thus, the multi touch processor and the channel scan logic can operate in parallel to quickly store and process incoming raw digital data without using too much memory.

Figure 7:
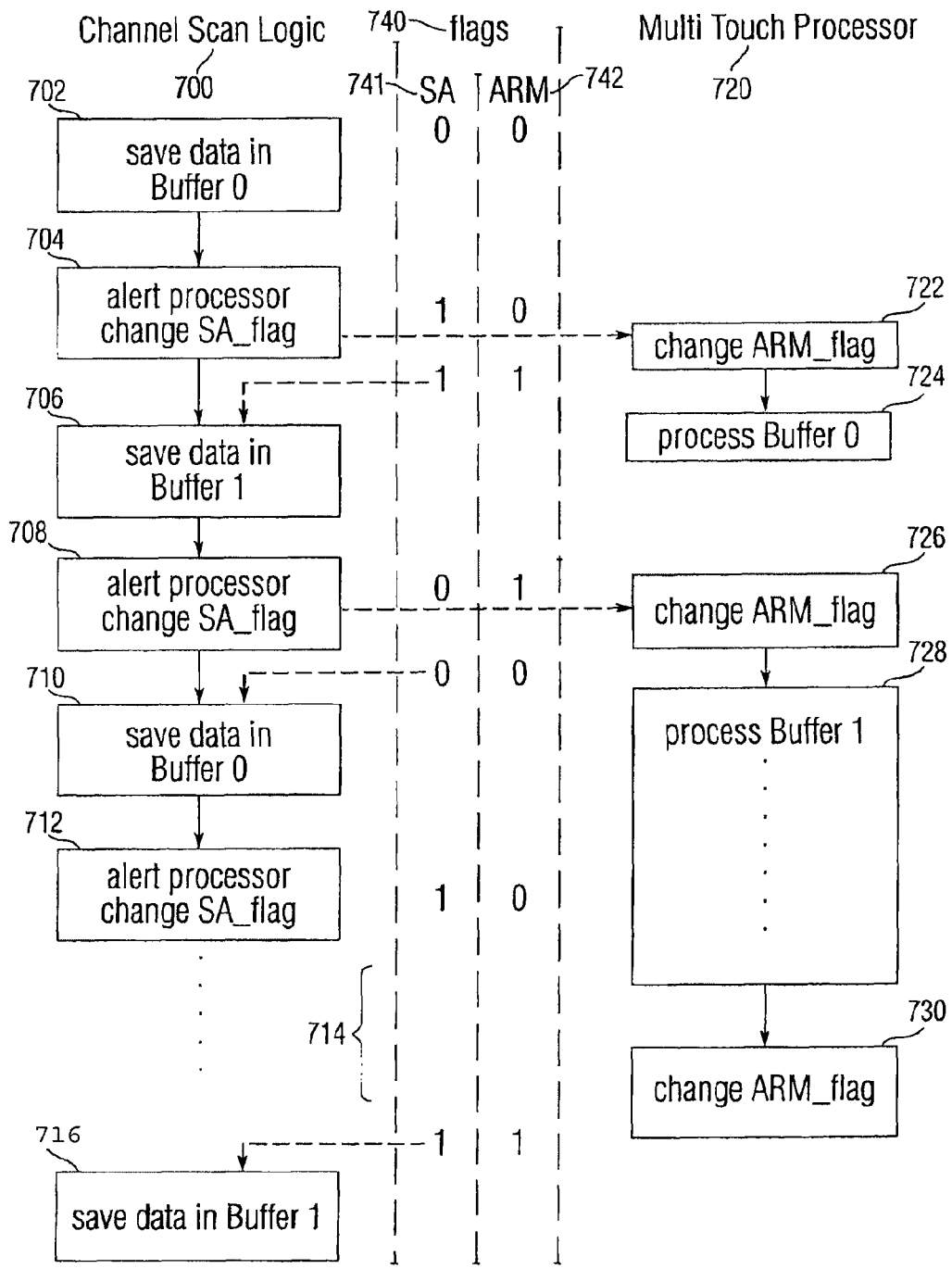
FIG. 7 is a flow chart showing the operation of the multi channel processor and the channel scan logic according to an embodiment of the invention.

Whereas FIGS. 5 and 6 refer to the individual operation of the channel scan logic and the multi touch processor respectively, FIG. 7 shows the operation of both these elements in order to emphasize the benefits of their parallel operation.

FIG. 7 is a flow chart of the operation of the channel scan logic and the multi touch processor according to an embodiment of the present invention. FIG. 7 is intended to show the timing of some simultaneously performed steps. Thus, steps in FIG. 7 which are shown to be at the same vertical level are performed either simultaneously or substantially simultaneously. Column 700 indicates actions performed by the channel scan logic, while column 720 indicates actions performed by the multi touch processor. Column 740 indicates values of the flags while the various actions are performed. The values of the SA_flag are listed in column 741 and the values of the ARM_flag in column 742. Because of limited space and to ease understanding FIG. 7 may not include all steps listed in FIGS. 5 and 6, however, it will be obvious to the person of skill in the art when and how the omitted steps are performed.

Initially both flags are set at 0. Noting that both buffers are equal and they are both valued at 0 the channel scan logic saves a data set in Buffer0 (step 702). Having finished writing data to the buffer, the channel scan logic changes the SA_flag to 1 and alerts the processor in step 704. Having received the alert and since it does not need to finish processing another buffer (see step 602 in FIG. 6), the multi touch processor changes the ARM_flag to 1 (step 722). It then begins processing the current buffer. At this point, the current buffer is the one with value opposite to that of ARM_flag, i.e., Buffer0 (see discussion of FIG. 6 above). Meanwhile, after the value of ARM_flag is changed in step 722, the channel scan logic notes that the values of the two buffers are again the same. Therefore, it continues to save new incoming raw digital data to Buffer1 (step 706). The channel scan logic selects Buffer1, because both flag values are equal to 1. As can be seen, steps 706 and 724 can be performed in parallel. While new data is being saved in Buffer1, the previously saved data in Buffer0 is being processed.

At step 708, the channel scan logic again alerts the processor that it has finished filling another buffer and changes the SA_flag to 0 (step 708). In response, the multi channel processor changes the ARM_flag to 0 (step 726) and initiates processing of Buffer1 (step 728). At this point, both buffers are again equal (this time at 0), so the channel scan logic proceeds to save another set of raw digital data, this time in Buffer0 (710).

It should be noted that in step 710, the channel scan logic is actually overwriting data previously stored in Buffer0 during step 702. This is not a problem, however, because the processor has finished processing the data in Buffer0, and it has indicated that it has finished doing so by changing the ARM_flag to 0 in step 726.

Thus, in addition to saving time and increasing processing speed through parallel operation of the channel scan logic and the multi touch processor, the presently described embodiment also improves memory efficiency by allowing the two buffers to be quickly overwritten as new raw digital data is coming in.

Step 728 illustrates the occurrence of an event, which while usually considered undesirable may happen, and can be handled by the currently described embodiment of the invention. The event is that step 728 takes longer than usual. This may happen because Buffer1 may include some type of data that is especially difficult to process. Or alternatively, the multi touch processor may be busy with or interrupted by other tasks, such as for example, communicating with the host processor 128.

In this case, the channel scan logic may alert the processor and change the SA_flag in step 712, while the processor is still executing step 728. However, the processor will not change the ARM_flag (step 730) until step 728 has finished executing. This is the case, because (with reference to FIG. 6) the processor needs to finish executing step 602 before it initiates step 604.

Since the ARM_flag has not been changed, the two flags are not the same during period 714. Therefore, during that period the channel scan logic waits and does not store new data (see steps 500 and 502 of FIG. 5). Thus, it avoids overwriting unprocessed data in the buffers. Only after the multi touch processor changes the ARM_flag at step 730, making the values of the two buffers equal, will the channel scan logic save new data in Buffer1 (step 716).

In one embodiment of the invention, when the channel scan logic is forced to wait for a buffer to free up, it can drop incoming information. For example, it can stop digitizing incoming analog signals, or it can form the raw digital data but not save it anywhere, causing it to be lost.

In another embodiment, while waiting the channel scan logic can actually cause the incoming sensory data to stop. It may achieve this by communicating with the driver logic 114 to cause it to stop sending stimulation signals to the multi touch panel. Once the stimulation signals are stopped, no meaningful sensory signals will arrive at the analog channels 108. This may be used to save power when multi touch processor is unable to process new incoming information.

A person of skill in the art would recognize that different embodiments of the invention other than the ones described above are possible. For example, the two flag scheme described above has been found useful, but other embodiments of the invention may feature a different flag scheme which features the same or a different number of flags. Also, a person of skill in the art would recognize that, as mentioned above, more than two buffers may be used.

Thus, for example, an embodiment of the present invention can feature a processor, an incoming data module (of which the channel scan logic can be a specific example), a set of one or more flags, and a set of two or more buffers. The incoming data module can receive incoming data. It can consult the flags to determine which buffer is free and available to be overwritten, and save a set of incoming data into that buffer. Subsequently, the incoming data module can repeatedly consult the flags and save new sets of incoming data in new buffers, as long as buffers and incoming data are free and available to be overwritten.

While the incoming data module is saving data into a given buffer, it can modify the flags to indicate that that given buffer is being used; and when it is finished saving data into a buffer it can modify the flags to indicate that that particular buffer contains new data and thus is not available to be overwritten.

Meanwhile, the processor can consult the flags to determine which buffer includes new data and is not being used (i.e., written to), and process the data of that buffer. After completing the processing of the data of a particular buffer, the processor can change the flags to indicate that the data in that buffer has been processed and is thus free to be overwritten.

A person of skill in the art would recognize that the above described general embodiment may be modified for use with multiple processors, and/or multiple incoming data modules operating in parallel.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for processing incoming data by an incoming data module and a processor, the method comprising:
   receiving a plurality of incoming analog data by the incoming data module, the plurality of incoming analog data generated by at least applying stimulation signals to a multi-touch panel;
   digitizing the plurality of incoming analog data into incoming sets of digital data,
   selecting one of at least two buffers;
   saving a first set of data into the selected one buffer by the incoming data module;
   alerting the processor to indicated that the incoming data module has completed saving the first set of data into the selected one buffer;
   processing the first set of data in the selected one buffer by the processor;
   selecting the other of the at least two buffers;
   saving a second set of data into the selected other buffer by the incoming data module;
   alerting the processor to indicated that the incoming data module has completed saving the second set of data into the selected other buffer;
   processing the second set of data in the selected other buffer by the processor;
   alternately saving additional first sets of data into the selected one buffer and additional second sets of data into the selected other buffer, wherein the sets of digital data correspond to the first set of data, the second set of data, the additional first sets of data and the additional second sets of data; and
   stopping the saving of at least one of:
      (1) one of the additional first sets of data if the processor is busy processing another of the additional first sets of data from the selected one buffer; and
      (2) one of the additional second sets of data if the processor is busy processing another of the additional second sets of data from the selected other buffer;
   wherein the stopping the saving of at least one of one of the additional first sets of data or one of the additional second sets of data includes at least one of:
      (1) stopping the generation of at least some of the plurality of the incoming analog data;
      (2) stopping digitizing of at least some of the plurality of incoming analog data; and
      (3) digitizing the plurality of incoming analog data but not saving at least portions of the sets of digital data corresponding to at least one of the ones of the additional first sets of data and the ones of the additional second sets of data.

2. The method of claim 1, stopping the generation of the at least some of the plurality of the incoming analog data includes stopping the applying of at least some of the stimulation signals to the multi-touch panel.

3. The method of claim 1, wherein the stopping the generation of at least some of the plurality of incoming analog data is initiated by the incoming data module.

4. The method of claim 3, wherein the stopping of the generation of at least some of the plurality of incoming analog data is performed by stopping a generation of one or more stimulation signals.

5. The method of claim 2, wherein the incoming data module and the processor operate in parallel.

6. The method of claim 1, wherein the incoming data module and the processor operate in parallel.

7. The method of claim 1, wherein the saving of additional first sets of data into the selected one buffer and additional second sets of data into the selected other buffer includes overwriting data previously stored in and processed from the selected one buffer and the selected other buffer respectively.

8. A method for processing data by an incoming data module and a processor, the incoming data module and processor connected to a common bus, the method comprising:
   receiving a plurality of incoming analog data by the incoming data module;
   digitizing the plurality of incoming analog data into at least a first and second set of digital data,
   consulting one or more flags by the incoming data module to select a first buffer connected to the common bus from a plurality of buffers, the first buffer being available to store information therein;
   storing the first set of digital data into the first buffer by the incoming data module, the incoming data module accessing the first buffer over the common bus;
   modifying at least one of the one or more flags to set a first value to indicate that new information has been stored in the first buffer by the incoming data module;
   processing the information in the first buffer by the processor, the processor accessing the first buffer over the common bus; and
   modifying at least another of the at least two flags by the processor to set the two flags to a second value to indicate that a second buffer is available to store information therein,
   simultaneously consulting the at least two flags by the incoming data module to select the second buffer in response to the two flags being set to the second value;
   storing the second set of data into the second buffer by the incoming data module, the incoming data module accessing the second buffer over the common bus;
   wherein:
   the processor and the incoming data module operate in parallel; and
   the incoming data module is operable for stopping the generation of incoming analog data by the incoming data module when the processor has not completed processing the first set of data in the first buffer and the incoming data module has completed storing the second set of data in the second buffer.

9. The method of claim 8, wherein the incoming data module is storing a second set of data into a second buffer, while the processor processes the first set of data in the first buffer.

10. A system for processing incoming information comprising:
   a multi-touch panel providing a plurality of incoming analog data generated by at least applying stimulation signals to the multi-touch panel;

an incoming data module connected to receive the plurality of incoming analog data;
a processor connected to the incoming data module;
a memory comprising at least a first and a second buffer connected to the processor and the incoming data module; and
at least two flags accessible by the processor and the incoming data module;
wherein the incoming data module is configured to
digitize the plurality of incoming analog data and generate incoming sets of digital data corresponding thereto,
wait until the two flags have a first value, and when the two flags have the first value, select the first buffer,
save a first set of the incoming sets of digital data into the selected first buffer, change a value of the at least two flags, and send a first alert to the processor,
wait until the at least one flag has a second value, and when the at least two flags have the second value, select the second buffer,
save a second set of incoming sets of digital data into the selected second buffer, change a value of the at least two flags, and send a second alert to the processor;
wherein the processor is configured to
receive the first alert, identify the first buffer, change the value of the at least two flags if all data in the second buffer has been processed, and process the data of the first buffer, and
receive the second alert, identify the second buffer, change the value of the at least two flags if all data in the first buffer has been processed, and process the data of the second buffer, and
wherein the incoming data module is further configured to stop the saving of additional first sets of the incoming sets of digital data in the first buffer when the processor has not yet completed processing one of the incoming sets of digital data previously stored in the first buffer by stopping the applying of the stimulation signals to the multi-touch panel.

11. The system of claim 10, wherein the processor and the incoming data module operate in parallel.

12. The system of claim 10, wherein the memory further comprises instructions, which are executed by the processor in order to perform its associated steps.

13. The system of claim 10, wherein the incoming data module further comprises application specific logic which performs its associated steps.

14. The system of claim 10 wherein the memory is random access memory.

15. The system of claim 10, wherein the memory is a register file.

16. The system of claim 10, further comprising a common bus connecting the incoming data module, the memory and the processor.

17. The system of claim 10, wherein the saving of the first set of the incoming sets of digital data into the selected first buffer comprises overwriting previously saved and processed data.

18. A system for processing incoming information comprising:
a source of incoming data;
an incoming data module connected to the source of incoming data;
a processor connected to the incoming data module;
a memory comprising two buffers and connected to the processor and the source of incoming data; and
two flags accessible by the processor and the source of incoming data;
wherein the incoming data module is configured to
wait until two flags have first values and when the two flags do have first values, select one of two buffers depending on the values of the flags, save a set of data received from the source of incoming data into the selected buffer, change a first flag of the two flags, and alert the processor,
wherein the processor is configured to
receive the alert and change the second flag if all data in the other one of the two buffers has been processed, and
wherein the incoming data module is further configured to
wait until two flags have a second values, the second value different from the first value, and when the two flags do have the second values, select the other of the two buffers based on the values of the flags and save another set of data into the other selected buffer; and
wherein the incoming data module is configured to delay receipt of yet another set of data from the source of incoming data if both of the two buffers contain sets of data that have not yet been processed by the processor.

19. The system of claim 18, wherein the source of incoming data is a multi-touch panel providing analog touch signals in response at least in part to the application of stimulation signals;
the incoming data module is configured to digitize the analog touch signals to provide the sets of data; and
the incoming data module is configured to delay the application of the stimulation signals.

20. The system of claim 19 wherein the processor and the incoming data module operate in parallel.

21. The system of claim 19, wherein the memory further comprises instructions, which are executed by the processor in order to perform its associated steps and the incoming data module further comprises application specific logic which performs its associated steps.

22. The system of claim 18, wherein the system is a mobile telephone.

23. The system of claim 18, wherein the system is a portable audio player.

24. The system of claim 18, wherein the incoming data module, the processor and the memory are coupled together over a common bus.

25. A mobile telephone comprising:
a source of incoming data having a multi-touch panel providing analog touch signals in response at least in part to the application of stimulation signals;
an incoming data module connected to the source of incoming data the incoming data module is configured to digitize the analog touch signals to provide sets of data;
a processor connected to the incoming data module;
a memory comprising at least two buffers and connected to the processor and the source of incoming data; and
at least two flags accessible by the processor and the source of incoming data;
wherein the incoming data module is configured to
wait until the at least two flags have a first values, and when the at least two flags do have the first values, select one of at least two buffers depending on the values of the flags, save a set of data received from the source of incoming data into the selected buffer, change at least a first flag of the at least two flags, and alert the processor, wherein the processor is configured to
receive the alert, change at least the second of the at least two flags if all data in the other one of the two buffers has been processed, identify the selected one of the at least two buffers, and process the data of the selected buffer, and wherein the incoming data module is further configured to select the other of the at least two buffers based on the values of the flags when the at least two flags have the second value, the second value different from the first value and save another set of data into the other selected buffer; and wherein the incoming data module is configured to delay receipt of yet another set of data from the source of incoming data if both of at least the two buffers contain sets of data that have not yet been processed by the processor by preventing the application of the stimulation signals to the multi-touch panel.

26. A portable audio player comprising:
a source of incoming data having a multi-touch panel providing analog touch signals in response at least in part to the application of stimulation signals;
an incoming data module connected to the source of incoming data the incoming data module is configured to digitize the analog touch signals to provide sets of data;
a processor connected to the incoming data module;
a memory comprising at least two buffers and connected to the processor and the source of incoming data; and
at least two flags accessible by the processor and the source of incoming data;
wherein the incoming data module is configured to wait until the at least two flags have a first values, and when the at least two flags do have the first values, select one of at least two buffers depending on the values of the flags, save a set of data received from the source of incoming data into the selected buffer, change at least a first flag of the at least two flags, and alert the processor,
wherein the processor is configured to receive the alert, change at least the second of the at least two flags if all data in the other one of the two buffers has been processed, identify the selected one of the at least two buffers, and process the data of the selected buffer, and
wherein the incoming data module is further configured to select the other of the at least two buffers based on the values of the flags when the at least two flags have the second value, the second value different from the first value, and save another set of data into the other selected buffer; and
wherein the incoming data module is configured to delay receipt of yet another set of data from the source of incoming data if both of at least the two buffers contain sets of data that have not yet been processed by the processor by preventing the application of the stimulation signals to the multi-touch panel.

27. The method of claim 1, wherein saving the first and second sets of data and processing the data includes accessing the selected buffer over a common bus, the common bus connecting the incoming data module, the processor, and the at least two buffers.

28. A method for processing incoming sets of digital data from a multi-touch panel, the method comprising:
receiving a plurality of incoming analog data, the plurality of incoming analog data generated by at least applying stimulation signals to a multi-touch panel;
digitizing the plurality of incoming analog data into incoming sets of digital data,
selecting one of at least two buffers;
saving a first set of data into the selected one buffer;
processing the first set of data in the selected one buffer by a processor;
selecting the other of the at least two buffers;
saving a second set of data into the selected other buffer;
processing the second set of data in the selected other buffer by the processor;
alternately saving additional first sets of data into the selected one buffer and additional second sets of data into the selected other buffer, wherein the incoming sets of digital data correspond to the first set of data, the second set of data, the additional first sets of data and the additional second sets of data;
stopping the saving of at least one of:
(1) one of the additional first sets of data if the processor is busy processing another of the additional first sets of data from the selected one buffer; and
(2) one of the additional second sets of data if the processor is busy processing another of the additional second sets of data from the selected other buffer; and
wherein the stopping of the saving of at least one of one of the additional first sets of data or one of the additional second sets of data includes at least one of:
(1) stopping the generation of at least some of the plurality of the incoming analog data;
(2) stopping digitizing of at least some of the plurality of incoming analog data; and
(3) digitizing the plurality of incoming analog data but not saving at least portions of the sets of digital data corresponding to at least one of the ones of the additional first sets of data and the ones of the additional second sets of data.

29. The method of claim 28, wherein stopping the generation of at least some of the plurality of the incoming analog data includes stopping the applying of at least some of the stimulation signals to the multi-touch panel.

30. A method for processing incoming sets of digital data from a multi-touch panel, the method comprising:
receiving a plurality of incoming analog data, the plurality of incoming analog data generated by at least applying stimulation signals to a multi-touch panel;
digitizing the plurality of incoming analog data into incoming sets of digital data,
saving a first set of data into the a first buffer;
processing the first set of data in the first buffer by a processor;
saving a second set of data into a second buffer;
processing the second set of data in the second buffer by the processor;
alternately saving additional first sets of data into the first buffer and additional second sets of data into the second buffer, wherein the incoming sets of digital data correspond to the first set of data, the second set of data, the additional first sets of data and the additional second sets of data; and
stopping the saving of one of the additional first sets of data if the processor is busy processing another of the additional first sets of data from the first buffer;
wherein the stopping of the saving includes stopping the applying of at least some of the stimulation signals to the multi-touch panel.

31. A method for processing data by an incoming data module and a processor, the incoming data module and processor connected to a common bus, the method comprising:

receiving a plurality of incoming analog data by the incoming data module, the plurality of incoming analog data generated by at least applying stimulation signals to a multi-touch panel;

digitizing the plurality of incoming analog data into incoming sets of digital data, consulting at least two flags by the incoming data module to select at least a first buffer connected to the common bus from a plurality of buffers;

storing a first set of digital data into a first buffer by the incoming data module, the incoming data module accessing the first buffer over the common bus;

processing the information in the first buffer by the processor, the processor accessing the first buffer over the common bus; and modifying at least another of the at least two flags by the processor to set the at least two flags to a first value to indicate that a second buffer is available to store information therein, consulting the at least two flags by the incoming data module to select the second buffer in response to the two flags being in the first value;

storing the second set of data into the second buffer by the incoming data module, the incoming data module accessing the second buffer over the common bus;

storing additional sets of digital data in the first buffer if the processor has completed processing sets of digital data previously stored in the first buffer and inhibiting the storing of additional sets of digital data in the first buffer if the processor is busy processing at least one set of digital data previously stored in the first buffer; and the inhibiting of the storing being performed by stopping the applying of stimulation signals to a multi-touch panel.

* * * * *

UNITED STATES PATENT AND TRADEMARK OFFICE
CERTIFICATE OF CORRECTION

PATENT NO. : 8,489,783 B2
APPLICATION NO. : 11/650036
DATED : July 16, 2013
INVENTOR(S) : Thomas James Wilson Page 1 of 2

It is certified that error appears in the above-identified patent and that said Letters Patent is hereby corrected as shown below:

In the Claims

Column 13, claim number 1, line number 28, delete "indicated" and insert --indicate--.

Column 13, claim number 1, line number 36, delete "indicated" and insert --indicate--.

Column 16, claim number 25, line numbers 51-52, delete "an incoming data module connected to the source of incoming data the incoming data module is configured" and insert --an incoming data module connected to the source of incoming data, the incoming data module configured to--.

Column 17, claim number 26, line numbers 23-24, delete "an incoming data module connected to the source of incoming data the incoming data module is configured to" and insert --an incoming data module connected to the source of incoming data, the incoming data module configured to--.

Column 16, claim number 25, line number 61, delete "wait until the at least two flags have a first values" and insert --wait until the at least two flags have first values--.

Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,489,783 B2

Column 17, claim number 26, line number 33, delete "wait until the at least two flags have a first values" and insert --wait until the at least two flags have first values--.

Column 18, claim number 30, line number 49, delete "saving a first set of data into the a first buffer" and insert --saving a first set of data into a first buffer--.